3,359,197
FUNCTIONAL FLUIDS
Philip X. Masciantonio, Penn Township, Westmoreland County, and Myron H. Wilt, Monroeville, Pa., assignors to United States Steel Corporation, a corporation of Delaware
No Drawing. Filed Sept. 24, 1965, Ser. No. 490,057
2 Claims. (Cl. 208—14)

ABSTRACT OF THE DISCLOSURE

A functional fluid, liquid between about −30° F. and at least about 550° F. and thermally stable at a temperature of at least about 700° F. A high temperature coke oven tar fraction boiling within the limits of 315° C. and 455° C. is alkylated with propylene or butylenes. The alkylate is hydrogenated, then treated with activated alumina and fractionated to obtain the fluid.

---

This invention relates to functional fluids prepared from alkylated, hydrogenated coal-tar fractions having a nominal boiling range within the limits 210°–455° C., prior to alkylation.

There is a need for functional fluids for use in the operation of mechanical devices under a wide variety of environmental conditions. The definition of functional fluids usually includes such materials as hydraulic oils, heat-transfer media, specialty lubricants and flotation oils but excludes solvent, chemical and fuel uses. Since such fluids should be suitable for use at extremely low (−40° F.) and extremely high (700° F.) temperatures, a wide liquid range and thermal stability are primary requirements. The U.S. Air Force has summarized the need for functional fluids in its aerospace program. The test methods used to determine the physical properties of functional fluids are described in "Military Specifications Mil–H–2760–1(USAF)" Wright Patterson Air Force Base, Ohio, Jan. 23, 1964.

It is an object of the present invention to provide functional fluids especially suitable for use under both high and low extremes of temperature. It is another object of the invention to provide functional fluids that remain liquid between about −30° F. and 550° F. Other objects will become apparent during the subsequent discussion.

In accordance with this invention, it has been found that functional fluids that remain liquid between about −30° F. and 550° F. and are suitable for use under both high and low extremes of temperature may be prepared from alkylated, hydrogenated coal-tar fractions having a nominal boiling range within the limits 210°–455° C. prior to alkylation.

It is known to alkylate coal-tar fractions with, for example, olefins such as propylene, butylenes, pentenes, hexenes and the like. Alkylation may be effected in the liquid or vapor phase. Alkylating agents that have been employed include toluene sulfonic acid esters, alkyl aluminum compounds, phosphate esters, alkyl halides, alkyl boron compounds and a variety of unsaturated organic compounds.

The alkylated fractions may be hydrogenated in the presence of between about 10% and 15% by weight of a powdered nickel catalyst, at temperatures up to about 350° C. and at hydrogen pressures up to about 4,000 p.s.i.g. Hydrogenation is continued to saturation. This also tends to decompose to ammonia, hydrogen sulfide and water respectively, the nitrogen, sulfur and oxygen impurities that can affect thermal stability. The products are filtered to remove the catalyst and heated to remove said gaseous decomposition products. The products may thereafter be fractionated to remove small amounts of the light- and heavy-end materials.

Some alkylated, hydrogenated fractions may contain contaminants responsible for color formation or production of solids or decomposition products at elevated temperatures. Their removal to assure thermal stability and decomposition temperatures in excess of about 700° F. may be effected in a number of ways. For example, the hydrogenated fractions may be percolated through a column of silica gel or treated with activated alumina. The latter method is preferred. This treatment is followed by fractionation for the separation of a small amount of forerunnings and residue to assure an initial, preferred boiling point of about 550° F. and removal of high viscosity material, respectively. The high-boiling residue may have an initial boiling point between about 650° and 700° F. depending on the viscosity desired. The resulting fractionated product is useful as an hydraulic oil. Despite an initial boiling point at atmospheric pressure of 550° F., the product may remain fluid at about 700° F. at the elevated pressures existing in hydraulic-oil systems. The product exhibits thermal stability at temperatures in excess of 700° F.

In the following specific examples, commercial coal-tar fractions having relatively narrow, nominal boiling ranges within the broad range 210°–455° C. were treated as hereinabove described. The physical properties of the alkylated, hydrogenated fractions were determined in accordance with the cited "Military Specification Mil–H–2760–1(USAF)." Tentative Air Force general requirements for aerospace functional fluids are pour point, −50° F.; boiling point, 550° F.; thermal stability, 650° F. and viscosity, 3,000 centistokes (cs.) at −40° F.

Example 1

There were mixed together 1,000 grams of a coal-tar middle distillate fraction (nominal boiling range 315° to 355° C.) and 200 grams of p-toluenesulfonic acid in a 3-liter flask fitted with a stirring device and a reflux condenser. At a temperature of about 150° C., propylene gas was passed into the reactor at a rate of about 350 ml. per minute for a period of 9 hours. The weight gain due to addition of propylene was 327 grams. The reaction mixture was extracted with 200 ml. of an aqueous (20 percent by weight) sodium-hydroxide solution. The product was distilled using a Vigreux column. The distillate boiling in the range 350° to 385° C. was collected as product. The product distillate yield was 991 grams. Into a one-gallon Aminco rocking autoclave 971 grams of the propylated product and 97 grams of nickel-on-kieselguhr catalyst were placed. The reactor was heated to 300° C. and hydrogen gas was admitted to attain a pressure of 3500 pounds per square inch absolute (p.s.i.a.) for 4 hours. Thereafter, the catalyst was separated by filtration, and the filtrate was then heated to remove dissolved gases, such as ammonia and hydrogen sulfide. The hydrogenated product weighed 707 grams. The product was slurried with 40 ml. of 200 mesh activated alumina for 5 minutes and then filtered to separate the hydrogenated fluid. The material was distilled through the aforementioned Vigreux column at a pressure of 10 millimeters of mercury absolute (mm. Hg abs.). In Table I are set forth some distillation and viscosity data for the product. The distillate boiling in the range 550° to 650° F. was collected as the functional fluid product. The product weighed 350 grams. Some properties of the functional fluid are set forth in Table II.

TABLE I

| Fraction | Amount, wt. Percent | Boiling Point Range, °F., at 760 mm. Hg abs. | Viscosity Centistokes at 32° F. |
|---|---|---|---|
| A | 2.1 | Up to 500 | |
| B | 1.4 | 500 to 525 | |
| C | 1.8 | 525 to 550 | |
| D | 22.7 | 550 to 600 | 35 |
| E | 29.2 | 600 to 650 | 224 |
| F | 17.9 | 650 to 675 | 1,557 |
| G | 14.6 | 675 to 700 | 9,200 |
| H | 2.1 | 700 to 725 | |
| Residue | 8.2 | >725 | |

TABLE II

Viscosity, centistokes:
 At −30° F. ------------------------- 3,000
 At +100° F. ------------------------- 8
 At +210° F. ------------------------- 2
 Pour point, ° F. ---------------------- −55
 Thermal stability, ° F. ---------------- >700

It may be seen from the above tables that a coal-tar fraction boiling between about 315° and 355° C. that has been propylated, hydrogenated, treated with activated alumina nad fractionated, produces a fluid that has a wide liquid range from about −55° F. to at least about 550° F. The product meets the tentative Air Force requirements for aerospace functional fluids with respect to pour point, boiling point and thermal stability. The viscosity thereof is slightly higher than the specified 3,000 cs. at −40° F. From Table I it is obvious this requirement may be met by using a greater proportion of the product distilling between about 550° and 600° F.

*Example 2*

A functional fluid derived from coal-tar middle distillate by butylation and hydrogenation was prepared in a manner similar to that described in Example 1. Butylation was effected by using 1-butene at 160° C. for 21 hours. A weight gain of 365 grams resulted from the butylation. Following washing and distillation, 936 grams of butylated product were obtained boiling in the range 335° to 450° C. at 760 mm. Hg abs. In Table III are set forth some distillation and viscosity data for the fractionated product. The product collected as functional fluid after hydrogenating 971 grams of alkylated material amounted to 177 grams, boiling in the range 600° to 650° F. Some properties of the butylated, hydrogenated functional fluid are set forth in Table IV.

TABLE III

| Fraction | Amount, wt. Percent | Boiling Point Range, °F., at 760 mm. Hg abs. | Viscosity Centistokes at 32° F. |
|---|---|---|---|
| A | 1.0 | Up to 500 | |
| B | 1.7 | 500 to 525 | |
| C | 2.9 | 525 to 550 | |
| D | 14.4 | 550 to 600 | 28 |
| E | 12.1 | 600 to 625 | 75 |
| F | 11.3 | 625 to 650 | 209 |
| G | 15.6 | 650 to 675 | 655 |
| H | 14.7 | 675 to 700 | 2,400 |
| I | 12.8 | 700 to 725 | 8,800 |
| Residue | 13.5 | >725 | |

TABLE IV

Viscosity, centistokes:
 At −30° F. ------------------------- 18,700
 At +100° F. ------------------------- 12
 At +210° F. ------------------------- 2
 Pour point, ° F. ---------------------- −40
 Thermal stability, ° F. ---------------- >700

It may be seen from the above tables that a coal-tar fraction boiling between about 315° and 355° C. that has been butylated, hydrogenated, treated with activated alumina and fractionated, produces a fluid that has a wide liquid range from about −40° F. to at least about 600° F. The tables also show that where low-temperature viscosity is an important requirement for a functional fluid, the initial boiling point should be reduced to about 550° F. Reducing the initial boiling point also favors a lower pour point. From a comparison of Tables I and III, it it obvious that the butylated product exhibits a generally lower viscosity than does the propylated product. Aerospace requirements may be met by including in the functional fluid of Example II some of the product distilling between about 550° and 600° F.

*Example 3*

In a manner similar to that described in Example 1, a functional fluid was prepared from a light creosote fraction having a nominal boiling range between about 270° and 315° C. by propylation and hydrogenation. The distillate boiling in the range 550° to 575° F. was collected as the functional fluid product. Some properties thereof are set forth in Table V.

TABLE V

Viscosity, centistokes:
 At −30° F. ------------------------- 847
 At +100° F. ------------------------- 6
 At +210° F. ------------------------- 2
 Pour point, ° F. ---------------------- −70
 Thermal stability, ° F. ---------------- >700

It may be seen from the above table that a coal-tar fraction boiling between about 270° and 315° C. that has been propylated, hydrogenated, treated with activated alumina and fractionated, produces a fluid that has a wide liquid range from about −70° F. to at least about 550° F. The table also illustrates that where low-temperature viscosity and low pour point are important requirements for a functional fluid, the final boiling point may be lowered by narrowing the overall boiling range of the product. This product easily meets aerospace requirements and can obviously include more higher-boiling material.

*Example 4*

In a manner similar to that described in Example 1, a functional fluid was prepared from heavy creosote having a nominal boiling range between about 355° and 455° C. by propylation and hydrogenation. The distillate boiling in the range 550° to 675° F. was collected as the functional fluid product. Some properties thereof are set forth in Table VI.

TABLE VI

Viscosity, centistokes:
 At −30° F. ------------------------- 7,231
 At +100° F. ------------------------- 12
 At +210° F. ------------------------- 3
 Pour point, ° F. ---------------------- −69
 Thermal stability, ° F. ---------------- >700

It may be seen from the above table that a coal-tar fraction boiling between about 355° and 455° C. that has been propylated, hydrogenated, treated with activated alumina and fractionated, produces a fluid that has a wide liquid range from about −69° F. to at least about 550° F. To meet aerospace requirements for low-temperature viscosity, some high boiling fractions should be excluded, thereby narrowing the overall boiling range of the product.

While the above examples illustrate the preparation of preferred alkylated, hydrogenated functional fluids and the properties thereof as made from certain coal-tar fractions, changes may be made without departing from the spirit of the invention. Within the limits 210°–455° C. the usual, commercial creosote fractions have been treated, namely, light (270°–315° C.), medium (315°–355° C.) and heavy (355°–455° C.). In a similar manner may be treated the usual naphthalene fraction (210°–230° C.) and the methylnaphthalenes fraction (230°–270° C.). In general, the overall boiling range and viscosity of the alkylated, hydrogenated functional fluid will increase with increase in boiling range of the coal-tar fraction. It is obvious to mix two or more of the coal-tar fractions or functional fluids produced therefrom. The coal-tar fractions may be alkylated with olefins such as pentenes, hexenes and the like as well as with propylene and butylenes. The functional fluids are compatible with the usual commercial additives to improve such properties as oxidation stability, corrosivity, lubricity, foaming and viscosity.

It will be apparent that, for commercial preparation of functional fluids, the hereinabove described equipment may be of any design known to effect the desired results. The boiling ranges of all coal-tar fractions included in the specification and appended claims are nominal boiling ranges.

Although we have disclosed herein the practice of our invention, we intend to cover as well any changes or modifications therein which may be made without departing from the spirit and scope of the invention.

We claim:

1. A functional fluid comprising an alkylated, hydrogenated, activated-alumina treated and fractionated high temperature coke oven tar fraction having a boiling range within the limits 315°–455° C. prior to alkylation, said fluid being a liquid in the temperature range between about −30° F. and at least about 550° F. and exhibiting thermal stability at a temperature of at least about 700° F., said alkylation being effected with a para-toluene sulfonic acid catalyst and an olefin chosen from the group consisting of propylene and butylenes and said hydrogenation being effected with a nickel metal catalyst.

2. A functional fluid derived from a high temperature coke oven tar fraction having a boiling range within the limits 315°–455° C. by a process comprising contacting a said fraction, an olefin chosen from the group consisting of propylene and butylenes and a para-toluene sulfonic acid alkylation catalyst at an alkylation pressure and temperature in a liquid-phase alkylation zone, extracting an alkylated fraction and contacting said fraction, hydrogen and a nickel metal catalyst at hydrogenation temperature and pressure in a hydrogenation zone, separating and treating a hydrogenated product with activated alumina, separating and fractionating a so-treated product and collecting said functional fluid which is a liquid in the temperature range between about −30° F. and at least about 550° F. and exhibits thermal stability at a temperature of at least about 700° F.

References Cited

UNITED STATES PATENTS

| 2,335,596 | 11/1943 | Marschner | 260—671 |
| 2,462,793 | 2/1949 | Lee | 260—671 |
| 2,762,853 | 9/1956 | Jones et al. | 208—99 |
| 2,879,223 | 3/1959 | Cole et al. | 208—97 |
| 1,563,203 | 11/1925 | Lilienfeld | 208—14 |

FOREIGN PATENTS

| 1,376,221 | 9/1964 | France. |

DANIEL E. WYMAN, *Primary Examiner.*

P. E. KONOPKA, *Assistant Examiner.*